United States Patent [19]

Ryan

[11] Patent Number: 5,228,304
[45] Date of Patent: Jul. 20, 1993

[54] REFRIGERANT LOSS DETECTOR AND ALARM

[76] Inventor: David J. Ryan, P.O. Box 265, Chelan, Wash. 98816

[21] Appl. No.: 893,826

[22] Filed: Jun. 4, 1992

[51] Int. Cl.⁵ .............................................. G08B 21/00
[52] U.S. Cl. ...................................... 62/129; 200/230; 340/623
[58] Field of Search ................ 62/125, 126, 127, 129; 200/190, 199, 230; 340/623, 624, 625

[56] References Cited

U.S. PATENT DOCUMENTS

| | | | |
|---|---|---|---|
| 842,082 | 1/1907 | Clayton | 200/230 X |
| 2,120,825 | 6/1938 | Wolfert | 340/623 X |
| 2,246,800 | 6/1941 | Ingram | 200/230 X |
| 2,600,659 | 6/1952 | Koch, Jr. | 200/230 X |
| 3,155,956 | 11/1964 | Hornbostel, Jr. et al. | 340/625 X |
| 3,662,131 | 5/1972 | Leistiko | 340/623 X |
| 4,308,725 | 1/1982 | Chiyoda | 62/129 |
| 4,553,400 | 11/1985 | Branz | 62/127 |
| 4,745,765 | 5/1988 | Pettit | 62/129 |
| 4,856,288 | 8/1989 | Weber | 62/129 |
| 4,922,234 | 5/1990 | Murphy | 340/623 X |
| 5,072,595 | 12/1991 | Barbier | 62/129 |

Primary Examiner—Harry B. Tanner
Attorney, Agent, or Firm—Richard C. Litman

[57] ABSTRACT

A refrigerant loss detector and alarm, the detector device suitable for installation in the piping of a refrigeration system which utilizes a liquid/vapor phase change substance as the refrigerant. Upon detection of refrigerant vapor accumulating in the loss detector, thereby displacing refrigerant liquid therefrom, the orientation of a float element containing a mercury switch is affected. Upon a fall in refrigerant liquid level in the loss detector, the mercury switch becomes activated, thereby completing an external electrical circuit which contains a time delay device and an alarm device.

4 Claims, 3 Drawing Sheets

REFRIGERANT LOSS DETECTOR AND ALARM

BACKGROUND OF THE INVENTION

1. Field Of The Invention

This invention relates to devices which can detect a small loss of refrigerant charge from refrigeration systems while in operation, and function to trigger an audible and/or visual alarm during any time the system is operating.

2. Description Of The Related Prior Art

The need for a method and apparatus to determine the amount of refrigerant in a refrigeration system, particularly a large system, has long been recognized. There are several reasons why this measurement is important, but the main concern for most refrigeration systems is the need to detect a low refrigerant condition as the result of a steady loss of refrigerant over time due to leaks in the pressurized system. A low refrigerant condition initially results in a gradual loss of cooling capacity which, if not detected and corrected, can result in such a critical loss of refrigerant that expensive damage can occur to a refrigerant compressor due to lubrication failure.

U.S. Pat. No. 4,553,400, issued Nov. 19, 1985 to Michael A. Branz, discloses a comprehensive refrigerant monitor and alarm system with emphasis on the electrical and electronic features of the system. When adapted to commercial refrigeration systems for supermarket display cases, it is seen that the level of refrigerant in a large common receiver is to be monitored by a conventional liquid level sensing float. A liquid level indicator provides a constant readout of the level in the receiver, triggers a timer controlled alarm when a critically low level is reached. By contrast, the present invention reliably detects a loss of refrigerant at a convenient, accessible location which can be located remotely from the receiver.

U.S. Pat. No. 4,308,725, issued Jan. 5, 1982 to Tsuneyuki Chiyoda discloses a simplistic device for detecting the quantity of refrigerant in a liquid receiver. In one embodiment, a floating hollow ball within a float guide can rise or fall with the refrigerant level, and as the level drops due to the loss of refrigerant, ultimately the ball comes in contact with a pair of electrical conducting elements, and the ball, being made of conductive material, then completes an alarm circuit through the contacts to energize an external alarm. An ingenious electronic circuit filters out very short electrical contact times in the detector which may be caused by mechanical vibrations. The positive make-or-break characteristics of the switching device of the present invention renders it largely immune to such rapid short contact times, as would be induced by mechanical vibration.

U.S. Pat. No. 4,745,765, issued May 24, 1988 to Edward D. Pettitt, discloses a refrigerant detecting device which illustrates a new inventive trend in liquid level sensors. This type of sensor responds to "condition sensing" and can determine a low refrigerant charge level without actually being located within or near a receiver containing the bulk of the liquid charge. This condition sensing device, located in the discharge line from an evaporator, detects refrigerant super heat temperature and also contains a bi-metal ambient air temperature sensor. An internal electrical contact closes to activate an alarm when a predetermined combination of evaporator super heat and ambient air temperature occurs indicating an undesirably low amount of refrigerant in the system. It is a complex precision device compared to the simplicity of the present invention.

U.S. Pat. No. 4,856,288, issued Aug. 15, 1989 to Robert C. Weber, discloses a refrigerant detection device which is to be installed at a predetermined location in a refrigerant high pressure liquid line. It consists of a preferably transparent hollow cylinder, a few inches in height in which a float of conductive material is disposed. As the conductive float follows the liquid level down in the cylinder, it eventually reaches a pair of electrically conductive contact points and thereby completes an electrical circuit which is indicative of refrigerant loss and therefore can activate a refrigerant low level alarm. Several embodiments of the invention are disclosed including versions having two conductive floats. A time delay means is suggested to avoid activation of the alarm during the compressor startup phase.

The conductive float sensor of this invention may be subject to short, rapid electrical contact times which can be caused by mechanical vibrations, same as referred to above for the Chiyoda Patent, but the present invention is immune to the effects of mechanical vibration and the resultant rapid contact cycling.

None of the above inventions and patents taken either singly or in combination, is seen to describe the instant invention as claimed.

SUMMARY AND OBJECTS OF THE INVENTION

By the present invention, an improved low cost reliable refrigerant loss detector is disclosed and claimed. It is capable of detecting the loss of a small amount of refrigerant in a closed system compared to the total system capacity. It is further provided with an electrical circuit containing a time delay apparatus which acts to prevent unnecessary and undesired false alarm signals, during transient refrigeration conditions which occur during the first minute of system operation. An audible alarm and/or visual alarm may sound after one minute, signaling a low refrigerant condition, and the alarm will continue as long as the refrigeration compressor is operating and the low refrigerant condition persists.

Accordingly, it is a principal object of the present invention to provide a refrigerant loss detector which may be mounted at a point in a closed system remote from the refrigerant receiver, and which reliably determines that a small amount of refrigerant charge in the closed system has been lost.

It is another object of the present invention to provide a refrigerant loss detector that can initiate and maintain an electrical circuit to an audible or visual alarm during continued operation of a refrigeration compressor in a system in which a loss of refrigerant has been detected.

It is a further object of the present invention to include an interval time delay apparatus which functions to prevent the transmission of false alarm signals which may be initiated by the loss detector during the unstable, non-typical refrigerant conditions which exist during the brief system startup phase.

Still another object of the present invention is to provide a refrigerant loss detector which can be readily installed in a refrigerant liquid line either by an original equipment manufacturer (OEM) at the factory, or by tradesmen during construction of a new system, or as a retrofit to an existing system.

It is an object of the present invention to energize the refrigerant loss detector and alarm circuitry and maintain it in a monitoring status continuously during the time that the refrigeration compressor is operating.

It is an object of the present invention to provide improved elements and arrangements thereof in an apparatus for the purposes described which is inexpensive, dependable and fully effective in accomplishing its intended purpose.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 5:
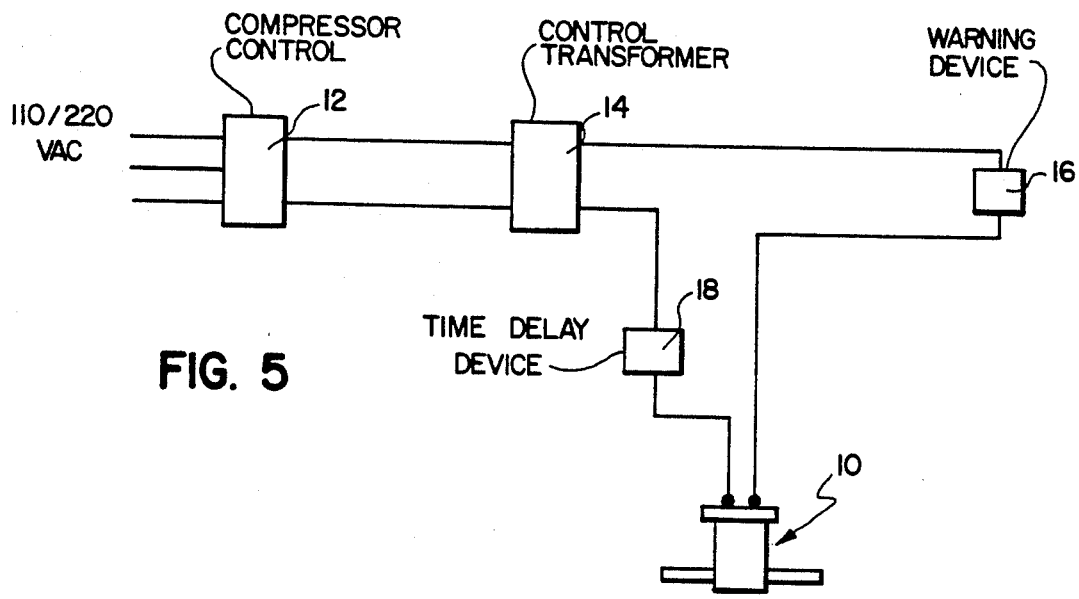
FIG. 5 is a wiring schematic of the refrigerant loss detector and alarm system.

The instant invention includes five major components, as shown on FIG. 5. Electric contacts in the compressor operating control 12 provide the source of power, generally 110 volts or 220 volts A.C. The loss detector 10 and alarm system are operational whenever the compressor operates. The control transformer 14 steps down the primary voltage which is generally 110 volts or 220 volts A.C., to a secondary voltage of 24 or 30 volts A.C. or D.C., which powers the warning device 16 through a time delay device 18 and the refrigerant sensor 10. The warning device 16 may produce an audible signal, such as a bell or horn, or a visual signal, or both, or an automatic printout. Refrigerant sensor 10 will be further described herein.

Since the refrigerant loss detector 10 will be incorporated into standard closed loop refrigeration systems, the system of FIG. 6 will be explained in some detail as background for understanding the operating principles and preferred embodiment of the instant invention.

Figure 6:
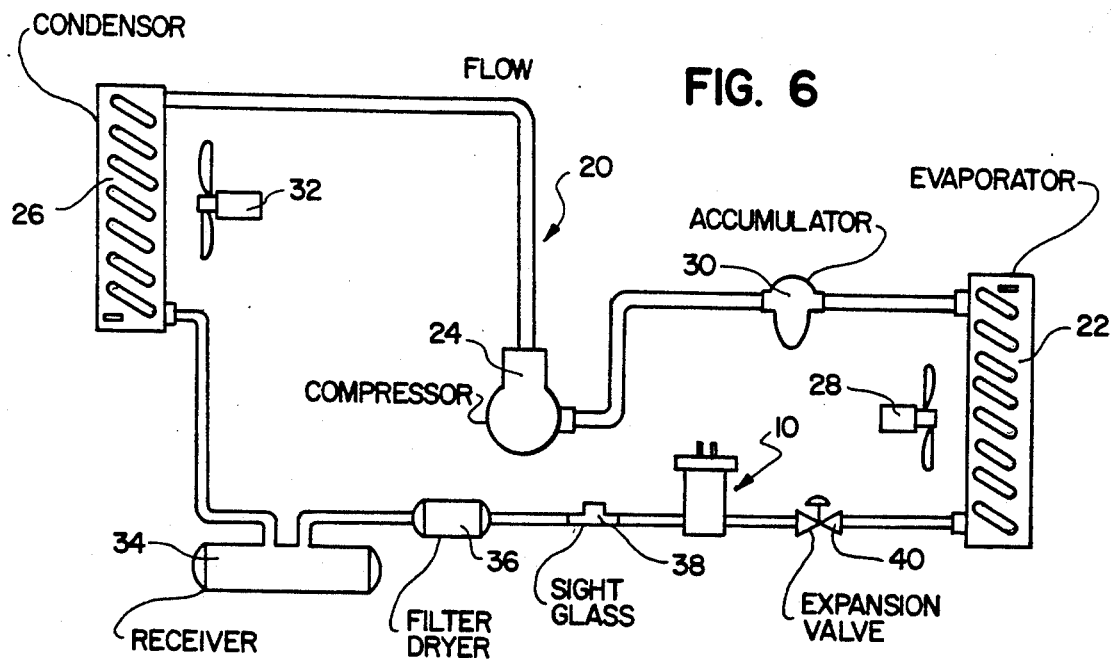
FIG. 6 is a piping schematic of a typical commercial refrigerant system showing the refrigerant loss detector installed.

A closed loop refrigeration system 20 including a refrigerant loss detector device 10 embodying the present invention is shown in FIG. 6. This system could apply to any large refrigeration system utilizing a liquid/vapor phase change refrigerant, examples of which include such materials as halogenated fluorocarbons (freon), ammonia, and sulfur dioxide. For a general application, the refrigerant system shall be considered a so-called "split system", one in which the refrigeration evaporator 22 apparatus is remotely located from the refrigerant compressor 24 and condensing apparatus 26. The refrigerant is a halogenated fluorocarbon (freon) for the preferred embodiment. Halogenated fluorocarbons are the most common refrigerants in use today.

The description of FIG. 6 begins with the evaporator 22, of well known fin and tube construction, not further described herein. Air from the conditioned space moved by a power driven fan 28, passes across the heat transfer surface of the evaporator 22 wherein a refrigerant, having a boiling temperature that is lower than the temperature of the space to be cooled, permits the transfer of heat from the air passing through the evaporator 22 to the boiling refrigerant therein. The boiling refrigerant referred to undergoes a phase change from a liquid to a gas during this process. The liquid, now vaporized and exiting from the evaporator 22, courses through an accumulator 30 where any unvaporized liquid exiting from the evaporator is separated out. The refrigerant gas is then withdrawn from the accumulator 30 and enters the compressor 24 wherein both the pressure and the temperature of the gas are sharply increased. The now compressed refrigerant gas exiting from the compressor 24 at its discharge pressure has a saturation temperature low enough that it may be condensed in the condenser 26 by the condensing medium, usually air, as in this embodiment, but may also be water, using a suitable shell and tube heat exchanger (not shown) which is well known in the art. The vaporized refrigerant is condensed to a liquid in the condenser 26, from which the heat of vaporization is removed by ambient air circulated through the condenser 26 by fan 32. Excess liquid refrigerant is stored in receiver 34 and, upon demand of the throttling device or expansion valve 40, refrigerant will flow from the receiver 34 through filter dryer 35, sight glass 38, the refrigerant detector 10 of the instant invention and then through the expansion valve 40 completing the circuit into the evaporator 22. All of the above stated components are well known in the refrigeration art, except for refrigerant detector 10.

As explained above, the pressure of the refrigerant gas leaving the compressor 24 and entering the condenser 26 need be great enough that the refrigerant exiting the condenser will have been liquified. Under a "standard operating condition" of 95 degrees F. ambient air temperature, with air as the cooling medium, and using R-22 as the refrigerant, the compressor 24 will need to discharge the refrigerant gas at a pressure of at least 230 pounds per square inch gauge, in order to assure that the refrigerant in the piping between the condenser 26 and the expansion valve 40 remains liquid. Upon a gradual loss of refrigerant from the system, the compressor is handling a reduced mass flow rate, and as a result the design discharge pressure can no longer be maintained. While the discharge pressure is falling, the condensing temperature does not fall proportionately; it can fall no lower than the ambient air temperature, using air as the cooling medium in this case. Thus, through leakage, the liquid refrigerant pressure is gradually falling toward the pressure at which it will flash into vapor, the vaporization pressure.

Figure 1:
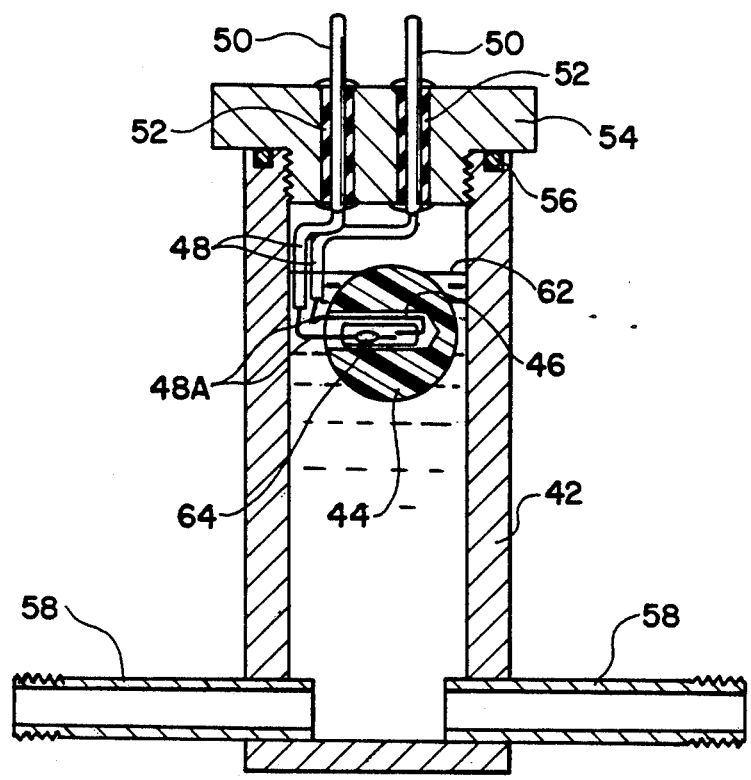
FIG. 1 is a cross-section elevational view of an embodiment of the refrigerant loss detector in which the float is buoyant at a high level of refrigerant.

Referring to FIG. 1, a preferred embodiment of the refrigerant sensor 10 comprises a generally vertical canister 42, within which is disposed a buoyant member 44 containing an inexpensive, sealed mercury switch 46 of the type generally used in the electronic industry to deactivate electrical circuits in the event of equipment tip over. The mercury switch 46 is connected through insulated copper conductors 48 within the vertical canister 42, and final connections being 1/64 inch thick copper braid ¼ inch in length to provide hinge type flexible connections 48A. The insulated conductors are connected to spade type electrical connectors 50, suitably mounted in insulated plug-like members 52. The top 54 of canister 42 is threadably removable from the canister. An 'O' ring 56 provides pressure sealing for the removable top 54. The refrigerant detector 10 is in communication with the liquid refrigerant through two tubular ports 58, and, preferably, is mounted as shown in FIG. 6, in a pressurized liquid line between the sight glass 38 and the expansion valve 40. Consequently when liquid refrigerant enters refrigerant detector 10 at a pressure close to the vaporization pressure, vapor bubbles will be forming and collecting in the top most volume of the canister 42 of sensor 10. Gradually the vapor will displace the liquid surface downward causing the buoyant member 44 to descend (FIG. 2) and also display a partial rotation owing to the restraint of the conductors 48.

Figure 2:
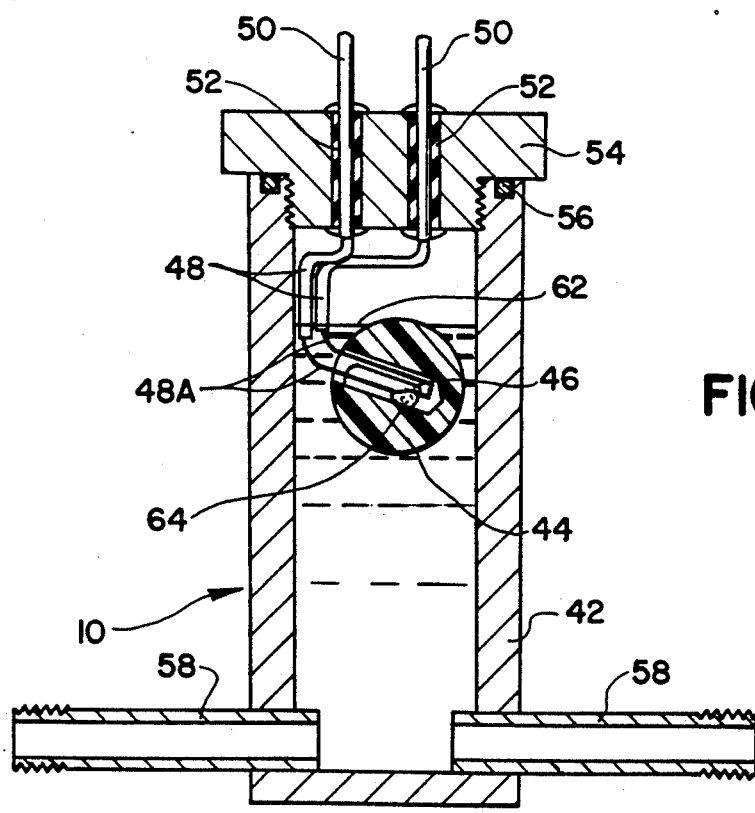
FIG. 2 is a cross-section elevational view of the embodiment of FIG. 1 in which the float is buoyant at a lower level of refrigerant.
Figure 3:
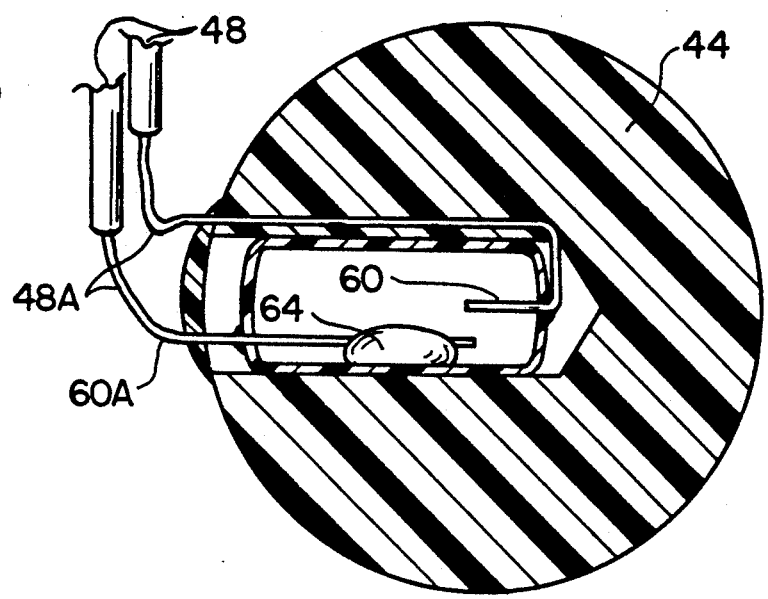
FIG. 3 is a cross-section elevational view of the buoyant float and mercury switch assembly.
Figure 4:
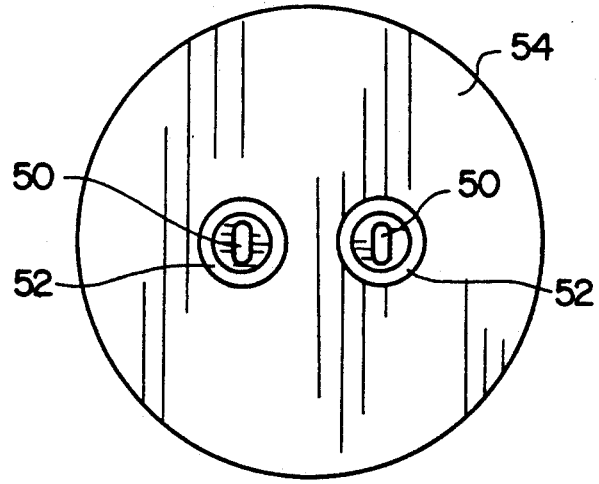
FIG. 4 is a top view of the loss detector removable cap.

As shown in FIG. 2, the mercury bead 64 will move so as to bridge the two electrodes 60 and 60a (see FIG. 3), providing a positive electrical "make" circuit through the mercury switch 46.

Referring to FIG. 5, a make circuit in refrigerant detector 10 completes a series electrical circuit from the transformer 14 secondary (not shown) through the time delay device 18 and also through the warning device 16. During the timed interval, the electronic time delay device provides only a weak current through the warning device 16, insufficient to activate it. After the delay period, full current flows from the secondary of the control transformer 14, through the time delay device 18, the refrigerant detector 10, and warning device 16 causing the warning device 16 to activate. As mentioned previously, the warning device 16 may be either audible, visual or a printout on a recording device.

It is to be understood that the present invention is not limited to the sole embodiment described above, but encompasses any and all embodiments within the scope of the following claims.

I claim:

1. In a refrigerant system utilizing a liquid/vapor phase change refrigerant, said refrigeration system having a condenser connected by a liquid refrigerant line to a throttling device, a refrigerant loss detection and warning system comprising:
    a source of electrical power;
    a step-down electrical voltage transforming device;
    a time delay device;
    a warning device to provide an indication upon a detection of refrigerant loss from said system;
    a loss detection device in communication with liquid refrigerant in said refrigerant line, said detection device incorporating a float operated switching means which, in response to a fall in a detected refrigerant level, provides an indication and warning of a loss of refrigerant in the system as a whole when such loss is detected;
    a series electrical circuit connecting said source of electrical power to primary windings in said voltage transforming device;
    a second series electrical circuit connecting secondary windings in said voltage transforming device to said time delay device, to said refrigerant level detection device, and to said warning device;
    wherein said loss detection circuit comprises:
        means defining a hollow, cylindrical closed chamber, said chamber having a top end and a lower portion, a sealing cap affixed to said chamber top end, a refrigerant inlet connection and a refrigerant outlet connection in said chamber lower portion, said connections being in fluid communication with the refrigerant line adjacent to the throttling device, whereby liquid and vapor refrigerant enters and substantially fills said chamber;
        said float operated switching means comprising:
            a buoyant float member, disposed in said chamber and being free to rise and descend and partially rotate with a rise or fall of liquid level in said chamber;
            sealed, self contained, and otherwise conventional mercury switch having therein a bead of mercury centrally embedded within said buoyant float member, and including a pair of electrodes within and in selective communication with said bead of mercury;
            said sealing cap further including fixed electrical terminals, there further being a pair of electrical conductors, partially insulated, and flexibly interconnecting said mercury switch electrodes and said cap electrical terminals; and
            said buoyant member with said mercury switch falling and rotating to close said mercury switch, with said head of mercury bridging said mercury switch electrodes, to provide said indication and warning of a loss of refrigerant, upon a fall of liquid level in said chamber.

2. The invention as claimed in claim 1, wherein said flexible insulated conductors extend from said buoyant float member, generally upwards within said liquid and vapor, to said fixed electrical terminals in said affixed cap, said terminals having conductive means through said cap, said conductive means terminating in fixed, spade-like electrical elements protruding above cap, whereby electrical continuity between said mercury switch and an external electrical circuit is facilitated.

3. The invention as claimed in claim 1, wherein said warning device comprises one of a horn, a bell, a light, and a graphical indication on a recording device.

4. The invention as claimed in claim 1, wherein said cap and said chamber top end further include mating thread means, for threaded engagement of said cap with said chamber top end, and 'O' ring seal means interfitted between said cap and said chamber top end, for providing a pressure seal between said cap and said chamber top end in assembly.

* * * * *